United States Patent [19]
Zdanowski et al.

[11] Patent Number: 4,517,330
[45] Date of Patent: May 14, 1985

[54] FLOOR POLISH COMPOSITION HAVING IMPROVED DURABILITY

[75] Inventors: Richard E. Zdanowski, Ft. Washington; Joseph M. Owens, Hatboro, both of Pa.

[73] Assignee: Rohm and Haas Company, Philadelphia, Pa.

[21] Appl. No.: 480,549

[22] Filed: Mar. 30, 1983

[51] Int. Cl.³ .............................................. C08K 3/10
[52] U.S. Cl. .................................... 524/408; 524/413; 524/431; 524/432; 524/433; 524/556; 524/561; 525/327.8; 525/329.5; 525/329.6; 525/330.2; 525/361; 525/367; 525/363
[58] Field of Search ............... 525/327.8, 329.5, 329.6, 525/330.2; 524/408, 413, 431, 432, 433, 556, 561

[56] References Cited

U.S. PATENT DOCUMENTS

| 2,754,280 | 7/1956 | Brown et al. | 525/330.2 |
| 2,884,336 | 4/1959 | Loshaek et al. | 525/330.2 |
| 3,267,083 | 8/1966 | Imhof | 525/330.2 |
| 3,413,158 | 11/1968 | Inouye et al. | 525/330.2 |
| 3,976,723 | 8/1976 | Williams et al. | 525/330.2 |

FOREIGN PATENT DOCUMENTS

| 1745938 | 1/1971 | Fed. Rep. of Germany . |
| 1745939 | 1/1971 | Fed. Rep. of Germany . |
| 51-107389 | 9/1976 | Japan . |
| 1155209 | 6/1969 | United Kingdom . |

Primary Examiner—Bernard Lipman
Attorney, Agent, or Firm—Alex R. Sluzas

[57] ABSTRACT

This invention is directed to floor polish vehicle compositions which yield floor polishes displaying improved durability. These floor polish vehicle compositions comprise a water insoluble emulsion copolymer containing acid functional monomer residues, transition metal ionic crosslinker, and a basic salt of an alkaline metal.

24 Claims, No Drawings

FLOOR POLISH COMPOSITION HAVING IMPROVED DURABILITY

BACKGROUND OF THE INVENTION

1. Field of the Invention

This invention relates to compositions useful for preparing polishes for floors, furniture, et al. having improved durability. Compositions of this invention are floor polish vehicle compositions comprising a water insoluble emulsion copolymer containing acid functional residues, a polyvalent metal ionic crosslinking agent, and a basic salt of an alkaline metal. The floor polish vehicle compositions of this invention are useful in preparing floor polish compositions which yield floor polishes and furniture polishes having improved durability.

2. Brief Description of the Prior Art

Ionically crosslinked floor polish vehicle compositions are well known in the prior art. A floor polish vehicle composition is defined to include an aqueous dispersion of a water insoluble synthetic resin film former and water soluble or dispersible metal salts and complexes. Floor polish compositions are defined to include floor polish vehicle compositions, alkali soluble resins, plasticizers, waxes, preservatives, dispersing agents, coalescing agents, leveling agents and the like.

Floor polish compositions based on aqueous dispersions of water insoluble emulsion copolymers containing acid functional residues and ionically crosslinked with polyvalent metal ions or complex crosslinking agents are well known in the art. Such coating compositions are disclosed in U.S. Pat. No. 3,328,325, granted June 27, 1967, to R. E. Zdanowski; U.S. Pat. No. 3,573,239, granted Mar. 30, 1971 to R. E. Zdanowski; U.S. Pat. No. 3,467,610, granted Sept. 16, 1969, to I. S. Fiarman et al.; U.S. Pat. No. 3,554,790, granted Jan. 12, 1971 to D. R. Gehman et al.; and U.S. Pat. No. 3,711,436, granted Jan. 16, 1973, to C. J. Oliver.

One important characteristic of the temporary protective film obtained from floor polish compositions is its resistance to deterioration resulting from pedestrian traffic. The greater its resistance, the more durable the floor polish is said to be. The general property of durability can be measured in a variety of ways. For example, scuff and scratch resistance, retention of film gloss, powder resistance, soil resistance, and black heel mark resistance are all well recognized in the floor polish art as indicia of durability. Acrylic polymers and copolymers are the most commonly used class of resins in floor finishes. It is well known, and practiced, that improved wear resistance in a formulated polish may be obtained by (a) increasing the polymer molecular weight, (b) increasing the copolymeric content of hard (that is, high glass transition temperature) monomers, (c) decreasing the copolymeric styrene content (if any), (d) increasing the polymeric acid functionality, and (e) increasing the level of polyvalent metal crosslinking agent. Each of these alternative routes toward improved wear resistance, when practiced individually or in concert, has offsetting commercial or performance disadvantages which have precluded significant advances in the development of polish films with improved durability under pedestrian traffic. For example, higher molecular weight vehicles, obtained through modification of the polymerization process or inclusion of specialty polyfunctional monomers or covalent crosslinking agents, are costly to prepare and formulate, and result in polishes with reduced gloss and reduced removability properties. Similarly, high glass transition copolymers obtained through the incorporation of increased levels of the lower alkyl acrylate or methacrylate esters, result in polish vehicles which are expensive to prepare, which require higher levels of expensive plasticizers to obtain low temperature film formation, and which are of reduced gloss. Copolymerizing high levels of styrene monomer with the conventional acrylates used in floor polish vehicles is well recognized to afford high gloss polish vehicles which are typified by poor black heel mark resistance. Reduction of the styrene in these modified-acrylate copolymers will improve the general wear resistance of these polishes, but the improvement occurs at the expense of reduced gloss and poor water resistance and alkaline detergent resistance. Because copolymeric acid functional monomers contribute toward high glass transition temperature, these may be considered a special case of using a harder polymer. The inclusion of increased levels of acid functional, or other polar or polarizable functional monomers, in the copolymer backbone, is practical as a route to improved polish durability. This practice, however, also results in poor performance in terms of storage stability, water resistance, alkaline detergent resistance, compatibility with standard polish formulating ingredients, and recoatability. To some extent these adverse effects of highly functionalized copolymers can be offset by concurrently increasing the level of polyvalent metal crosslinking agent. However, this measure increases cost, reduces gloss, increases plasticizer demand, and has little effect on the stability and compatibility problems. Increasing the level of polyvalent metal crosslinker without concurrently increasing the copolymeric acid content results in increased costs, polymer sedimentation instability, lower polish gloss and leveling performance, and increased plasticizer demand. It is apparent that the practice of the art of floor polish polymer design is a broad compromise between polish durability and a host of other properties desirable in a floor polish film.

SUMMARY OF THE INVENTION

One of the objects of this invention is to provide floor polish vehicle compositions which are useful in formulating floor finishes which have improved durability. Another object of this invention is to provide improved floor polish vehicle compositions which are useful in formulating floor finishes which combine improved durability with good gloss, leveling, recoatability, alkaline detergent resistance, removability, water resistance, storage stability and cost characteristics. Yet another object of this invention is to provide improved floor polish vehicle compositions having relatively low levels of copolymer acid and yet which provide floor polishes exhibiting good durability. Still another object of this invention is to provide floor polish vehicle compositions which yield floor polishes exhibiting improved black heel mark resistance. Yet another object of this invention is to provide floor polish vehicle compositions yielding floor polishes which exhibit improved durability while retaining a good balance of gloss, detergent resistance, leveling, recoatability, water resistance and stability. These and other objects, which will become apparent below, are met by this invention, a floor polish vehicle composition which yields floor polishes with improved durability, and which includes an emulsion copolymer containing from about 3% to about 50% by weight of residues of at least one acidic monomer and from about 15% to a 100% of the molar equivalent of the copolymeric acid residues of polyvalent metal ionic crosslinking agent, wherein the improvement comprises at least one basic salt of the alkaline metal such that the molar ratio of the polyvalent metal to the alkaline metal is from about 1.0:0.10 to 1.0:3.0. In one embodiment, the floor polish vehicle composition of this invention comprises an emulsion copolymer which contains from 0% to about 70% by weight of residues of at least one vinyl aromatic monomer, from 0% to about 40% by weight of residues of at least one polar or polarizable nonionogenic hydrophilic monomer, from 0% to about 10% by weight of residues of at least one monomeric vinyl ester in which the acid moiety of the ester is selected from the aromatic and ($C_1$-$C_{18}$) aliphatic acids, and from 0% to about 97% by weight of residues of at least one monomer selected from the acrylic acid methacrylic acid esters of ($C_1$-$C_8$) alcohols.

DETAILED DESCRIPTION OF THE INVENTION

This invention is directed to floor polish vehicle compositions which yield floor polishes with improved durability and which include an emulsion copolymer containing from about 3% to about 50% by weight of residues of at least one acidic monomer, from 0% to about 70% by weight of residues of at least one vinyl aromatic monomer, from 0% to about 40% by weight of residues of at least polar or polarizable nonionogenic hydrophilic monomer, from 0% to about 10% by weight of residues of at least one monomeric vinyl ester in which the acid moiety of the ester is selected from the aromatic and ($C_1$-$C_{18}$) aliphatic acids, from 0% to about 97% by weight of residues of at least one monomer selected from the acrylic and methacrylic acid esters of ($C_1$-$C_8$) alcohols, and at least about 15%, and preferably from about 15% to 100%, of the equivalent of the acid residues of polyvalent metal ionic crosslinking agent, wherein the improvement comprises at least one basic salt of an alkaline metal such that the molar ratio of the transition metal to the alkaline metal is from about 1.0:0.10 to 1.0:3.0.

A floor polish vehicle composition wherein the polyvalent metal is from about 35% to 80% of the equivalent of the acid residues and the molar ratio of polyvalent to alkaline metals is from about 1.0:0.25 to 1.0:2.0 is preferred. Still more preferred is a composition wherein the polyvalent metal is from about 40% to 70% of the equivalent of the acid residues and the molar ratio of polyvalent to alkaline metal is from about 1.0:0.5 to 1.0:1.5.

In a preferred embodiment, the invention is directed to a floor polish vehicle composition wherein the emulsion copolymer contains from about 6 to 30% by weight of residues of at least one acidic monomer, from 0% to about 25% by weight of residues of at least one polar or polarizable nonionogenic hydrophilic monomer, from 0% to about 5% by weight of residues of at least one monomeric vinyl ester in which the acid moiety of the ester is selected from the aromatic and ($C_1$-$C_{18}$) aliphatic acids, and from about 20% to 90% by weight of residues of at least one monomer selected from the acrylic and methacrylic acid esters of ($C_1$-$C_8$) alcohols.

In a more preferred embodiment, the invention is directed to a floor polish vehicle composition wherein the emulsion copolymer contains from about 10% to 25% by weight of residues of at least one acidic monomer, from about 10% to 50% by weight of residues of at least one vinyl aromatic monomer, from 0% to about 15% by weight of residues of at least one polar or polarizable nonionogenic hydrophilic monomer, and from about 30% to 90% by weight of residues of at least one monomer selected from the acrylic and methacrylic acid esters of ($C_1$-$C_8$) alcohols.

In a still more preferred embodiment, the invention is directed to a floor polish vehicle composition wherein the acidic monomer is selected from acrylic, methacrylic, itaconic, maleic and fumaric acids and maleic anhydride, the vinyl aromatic monomer is selected from styrene and vinyl toluene and the nonionogenic monomer is selected from acrylonitrile and the hydroxy ($C_1$-$C_4$)alkyl acrylates and methacrylates.

The alkali metal compounds of the instant invention are those comprised of an element or combination of elements from Group Ia of the periodic table of the elements, that is, lithium, sodium, potassium, rubidium, and cesium. These alkali metals form stable, monovalent ions in aqueous solution. Of these elements, lithium, potassium and sodium are preferred. The alkali metal compounds of the instant invention are those which are water soluble, that is, those which are soluble to an extent of greater than 1% by weight and which form a homogenous aqueous solution. The alkali metal compounds of this invention are those which have as their anion a moiety whose conjugate acid has a $pK_a$ more than 3.5 and whose conjugate acid is volatile, or hydrolytically unstable providing volatile decomposition products. For example, the anions of LiOH, NaHCO$_3$ and K(CH$_3$CO$_2$) have as their conjugate acid, water, carbonic acid and acetic acid respectively. Both water and acetic acid are volatile and carbonic acid is unstable, decomposing to form the volatile products CO$_2$ and water. In the alkali metal compounds of this invention, the limit of conjugate acid volatility is taken to be an upper limit boiling point of 300° C., or the formation of a binary azeotrope with water of at least 0.1% volume acid in the condensed phase. Examples of the alkali metal compounds of this invention are NaOH, KOH, LiOH, RbOH, CsOH, K(HCO$_2$), Na(CH$_3$CO$_2$), Na(HCO$_2$), Na$_2$CO$_3$, K(CH$_3$CH$_2$CH$_2$CO$_2$), Rb(CH$_3$CH$_2$CO$_2$), K(C$_6$H$_5$CO$_2$), Na(CH$_3$OCH$_2$CO$_2$) and Li(C$_6$H$_5$CH$_2$CO$_2$).

As is known in the art, because of their alkaline detergent scrub resistance, better soil and scuff resistance, and improved storage stability, anionic emulsions are preferred over nonionic emulsions for polymeric floor polish vehicles. However, anionic emulsions have poor stability with regard agglomeration and coagulation in the presence of divalent cations. For this reason it is known that the use of significant levels of multivalent metal crosslinking agents requires that they be incorporated into coordination complexes. This is believed to increase the size of the multivalent cations in the liquid emulsion, correspondingly reducing the charge per unit surface area and reducing agglomeration by increasing the size of the classical electric "double layer." For systems employing zinc as a polyvalent metal crosslinking agent, the crosslinking complex is often prepared from ZnO as is represented by the following series of equations:

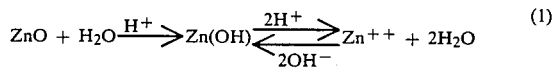 (1)

-continued

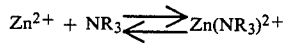

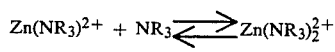

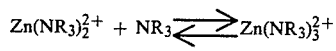

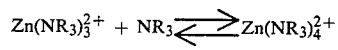

Calculation of the stability constants for the various possible complexes (Equations 2–5 above) indicates that the crosslinker solutions consist primarily of blends of the diamino and tetraamino complexes. Although these complexes are thermodynamically stable, the ligands are kinetically labile. The monoamino complex is relatively unstable and, in the presence of hydroxy ions, will rapidly revert back to insoluble $Zn(OH)_2$. In practice, the acid for the catalysis of the conversion of ZnO to $Zn(OH)_2$ and the acid for the conversion of $Zn(OH)_2$ to free $Zn^{++}$ ions may be supplied by any weak acid, such carbonic acid, ammonium bicarbonate, or an aliphatic, aromatic or amino acid, which will then serve (as a conjugate base) as the counterion for the divalent complex. Weak acids are preferred because they promote the process of counterion exchange when the metal complex is charged to an acid containing polymer floor polish vehicle:

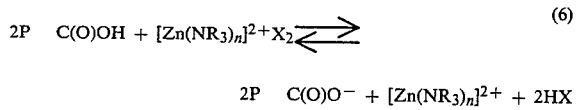

If the conjugate acid of the counterion, HX, is volatile, then the equilibrium reaction (6) of the counterion exchange for the metal complexes is shifted further to the right.

During the drying down and film formation process, the volatile amine ligands are lost to the vapor phase, shifting the equilibria ((2) through (5)) to the left, resulting in a crosslinked polymer film structure where the crosslinking may be either intramolecular or intermolecular.

In the practice of conventional polyvalent metal crosslinking of floor polish polymers, the level of crosslinker that can be added to an acid-containing emulsion polymer vehicle is limited by the amount of acid functionality that is readily available to the aqueous phase of the emulsion. This limit and the level of crosslinking are established not only by the level of acid-functional monomers incorporated in the emulsion copolymer, but also by the level and hydrophobicity of other comonomers present in the emulsion. The level of available acid functionality may be determined by very rapid titration of the emulsion, or established empirically by incrementally increasing the level of crosslinker complex charged until a sediment of $Zn(OH)_2$ is observed in the aged emulsion. This precipitate is formed from the complex metal which has not been able to undergo the counterion exchange reaction (6). Because of the equilibrium nature of the reaction leading to the formation of the stable metal complex, the loss of even low levels of $NR_3$ from the metal complex-polymer emulsion solution to the vapor phase on aging will result in the formation of insoluble $Zn(OH)_2$ and ZnO. Once these insoluble metal compounds are formed in the basic emulsion medium, the lack of acid for catalysis and reaction in step (1) means that the metal cannot be recovered for polymer crosslinking in the emulsion.

Incorporation of basic alkaline metal compounds in a polyvalent metal-complex floor polish emulsion vehicle allows the charging of the full stoichiometry of polyvalent metal by promoting the counterion exchange reaction (6). It is believed that the action of the basic metal salt is to apparently make available to the aqueous phase of the emulsion (and thus to the soluble polyvalent metal complex) all of the charged polymeric acid functionality in the emulsion polymer. However, this invention is not limited to any particular mode of action, and this suggested explanation in no way limits the invention. It is merely believed to be the most plausible explanation of the invention.

The action of the basic alkaline metal compounds is not to chemically alter the composition or structure the transition metal crosslinkers. This is demonstrated in Table II below where it is seen that the polymeric acid content still controls the optimum level of the polyvalent metal complex that can be charged. Though basic alkaline metal salts allow crosslinking to the stoichiometric limit with polyvalent metal compounds, exceeding this limit still results in the formation of $Zn(OH)_2$ and ZnO as precipitate. The composition of the precipitate is essentially identical to that formed in the absence of basic alkaline metal salt. The addition of basic alkaline metal compounds to the polyvalent metal crosslinker and emulsion polymer in the compositions of this invention results in a floor polish vehicle which can be crosslinked to the limit of the stoichiometry of the charged acid functionality. The practical result is that the basic alkaline metal salts result in increased polish durability. This effect is due to the alkaline nature of the metal salt anion, as well as the permanent (non-volatile) character of the metal cation. The proper balance of emulsion and polish wet properties requires that the basic alkaline metal compound be used in connection with the conventional polyvalent crosslinking technology known in the floor polish art. The relative molar ratio of polyvalent metal crosslinker and basic alkaline metal compound may be continuously varied to provide a wide spectrum of polish performance properties. The appropriate level chosen must be determined empirically, in light of the balance of polish performance properties desired. The resulting performance is also strongly dependent upon those properties inherent in the overall polymer composition and polish formulation, as is already practiced in this art. However, the practice of this invention greatly extends the range of polish durability accessible from any given polish polymer vehicle. This is particularly true for those floor polish polymers which are prepared using reduced molecular weight (e.g., by use of a chain regulator) since these are typically prepared with the understanding that durability will be sacrificed relative to higher molecular weight polymer containing polishes. Although reduced polymer molecular weights, and correspondingly reduced durability, have previously been offset by improvements in other polish properties such as gloss, leveling, and ability to form water-clear polish formulations, the extended polish durability made possible through the practice of this invention reduces the severity of the compromise in wear resistance properties previously required.

The instant invention is effective in enhancing floor polish durability over prior art polishes even in compositions in which the molar ratio of polyvalent metal crosslinker to polymer acid functionality exceeds unity as charged. In this case, some of the polyvalent metal crosslinker will precipitate reducing the overall quality of the polish film formed. However, the basic alkaline metal compound will still serve to enhance the durability of the polish film formed in the presence of the remaining solubilized polyvalent metal crosslinker.

It is known in the art of floor polish polymer vehicle design that the copolymeric acid functionality can be made more readily available to the aqueous phase of the emulsion by reducing the copolymer molecular weight, (see U.S. Pat. No. 4,017,664) or modifying the morphology of the polymer emulsion particle (see U.S. Pat. No. 4,150,005). These alternatives to the conventional high molecular weight, random polymer technology usually employed, are recognized as effective but they either depress the wear resistance of the resulting polish or are expensive in terms of processing costs.

Although it is known that the action of alkaline salts on acid containing emulsion copolymer will increase the availability of the polymeric acid functionality to the aqueous phase, as is practiced in the solubilization of acidic copolymers with base, the conjunction of this technology with the polyvalent metal crosslinking of floor polish emulsion vehicles is new to the art. Heretofore basic alkaline metal salts, or permanent bases in general, were taught as compounds to be avoided in the formulation of floor polishes, in spite of their reduced cost relative to the recommended volatile amine bases, because of loss of polish performance properties such as gloss, stability, water resistance, detergent resistance, powdering and soil resistance.

The preparation of aqueous dispersible water insoluble emulsion copolymers for use in floor polish vehicles is well known in the art. The practice of emulsion polymerization is discussed in detail in D. C. Blackley, *Emulsion Polymerization* (Wiley, 1975). The compositions of this invention may also be formulated using internally plasticized polymer emulsions. Preparation of internally plasticized polymer emulsion is described in detail in U.S. Pat. No. 4,150,005, granted Apr. 17, 1979, to D. R. Gehman et al, herein incorporated by reference. The preparation of non-internally plasticized floor polish emulsion polymers is described in U.S. Pat. No. 3,573,239, granted Mar. 30, 1971, to R. E. Zdanowski; U.S. Pat. No. 3,328,325, granted June 27, 1967 to R. E. Zdanowski; U.S. Pat. No. 3,554,790, granted Jan. 12, 1971 to D. R. Gehman et al; and U.S. Pat. No. 3,467,610, granted Sept. 16, 1969, to I. S. Fiarman et al, all herein incorporated by reference.

Conventional emulsion polymerization techniques may be used to prepare the polymers employed in the compositions of this invention. Thus the monomers may be emulsified with an anionic or nonionic dispersing agent, about 0.5% to 10% thereof on the weight of total monomers can be used. Acidic monomers are water soluble and thus serve as dispersing agents which aid in emulsifying the other monomers used. A polymerization initiator of the free radical type, such as ammonium or potassium persulfate, may be used alone or in conjunction with an accelerator, such as potassium metabisulfite or sodium thiosulfate. The initiator and accelerator, commonly referred to as catalysts, may be used in proportions of 0.5% to 2% each based on the weight of monomers to be copolymerized. The polymerization temperature may be from room temperature to 90° C., or more, as is conventional.

Examples of emulsifiers which are suited to the polymerization process of emulsions used in the present invention include alkaline metal and ammonium salts of alkyl, aryl, alkaryl, and aralkyl sulfonates, sulfates, and polyether sulfates; the corresponding phosphates and phosphonates; and alkoxylated fatty acids, esters, alcohols, amines, amides; and alkylphenols.

Chain transfer agents, including mercaptans, polymercaptans, and polyhalogen compounds, are often desirable in the polymerization mixture to control polymer molecular weight.

The acidic monomers which may be used in preparing the emulsions employed in the instant invention are alpha, beta-monoethylenically unsaturated acids such as maleic, fumaric, aconitic, crotonic, citraconic, acryloxypropionic, acrylic, methacrylic, or itaconic. Further examples of acidic monoethylenically unsaturated monomers that may be copolymerized to form the water insoluble addition polymers of the instant invention are partial esters of unsaturated aliphatic dicarboxylic acids and particularly, the alkyl half esters of such acids. Examples of such partial esters are alkyl half esters of itaconic acid, fumaric acid, and maleic acid wherein the alkyl group contains 1 to 6 carbon atoms. Representative numbers of this group of compounds include methyl acid itaconate, butyl acid itaconate, ethyl acid fumarate, butyl acid fumarate, and methyl acid maleate.

The polymers may contain from 0 to about 70% by weight of residues of at least one vinyl aromatic monomer. The vinyl monomers are alpha, beta-ethylenically unsaturated aromtic monomers such as styrene, vinyl toluene, 2-bromo-styrene, o-bromo-styrene, p-chlorostyrene, o-methoxy styrene, p-methoxy styrene, allylphenyl ether, allyltolyl ether, and alpha-methyl styrene.

The copolymers of this invention may contain from 0% to about 40% by weight of residues of at least one polar or polarizable nonionogenic hydrophilic monomer, such as acrylonitrile, methacrylonitrile, cis- and trans- crotononitrile, alpha-cyanostyrene, alpha-chloroacrylonitrile, ethyl vinyl ether, isopropyl vinyl ether, isobutyl vinyl ether, and butyl vinyl ether, diethylene glycol vinyl ether, decyl vinyl ether, vinyl acetate, hydroxyalkyl(meth)acrylates, such as 2-hydroxyethyl methacrylate, 2-hydroxyethyl acrylate, 3-hydroxypropyl methacrylate, butanediol acrylate, 3-chloro-2-hydroxypropyl acrylate, 2-hydroxypropyl acrylate, 2-hydroxypropyl methacrylate, and vinyl thiols such as 2-mercaptopropyl methacrylate, 2-sulfoethyl methacrylate, methyl vinyl thiol ether, and propyl vinyl thio ether.

The emulsion copolymers of the instant invention may contain from 0% to about 10% by weight of residues of at least one monomeric vinyl ester in which the acid moiety of the ester is selected from the aromatic and ($C_1$–$C_{18}$) aliphatic acids. Examples of such acids include formic, acetic, propionic, n-butyric, n-valeric, palmitic, stearic, phenyl acetic, benzoic, chloroacetic, dichloroacetic, gammachloro butyric, 4-chlorobenzoic, 2,5-dimethylbenzoic, o-toluic, 2,4,5-trimethoxy benzoic, cyclobutane carboxylic, cyclohexane carboxylic, 1-(p-methoxy phenyl)cyclohexane carboxylic, 1-(p-tolyl)-1-cyclopentane carboxylic, hexanoic, myristic, and p-toluic acids. The hydroxy vinyl moiety of the monomer may be selected from hydroxy vinyl compounds such as hydroxy ethylene, 3-hydroxyprop-1-ene, 3,4-dihydroxybut-1-ene, and 3-hydroxy-pent-1-ene, it being understood that such derivation can be purely formal such as in the case of the viny acetate monomer in which the compound may be considered to be derived from acetic acid and hydroxy ethylene, although the monomer cannot in fact be prepared from such precursor compounds.

The emulsion copolymers of this invention may contain from 0% to about 97% by weight of residues of at least one monomer selected from the acrylic and methacrylic acid esters of ($C_1$–$C_8$) alcohols such as methyl methacrylate, methyl acrylate, ethyl acrylate, ethyl methacrylate, n-butyl methacrylate, n-butyl acrylate, 2-ethylhexyl acrylate, n-octyl acrylate, sec-butyl acrylate, isobutyl methacrylate, and cyclopropyl methacrylate.

The ionic crosslinking agent employed in this invention may be a polyvalent metal complex containing a polyvalent metal moiety, an organic ligand moiety and, if the crosslinker is added as a chelate to the formulation in solubilized form, an alkaline moiety. The polyvalent metal ion may be that of beryllium, cadmium, copper, calcium, magnesium, zinc, zirconium, barium, aluminum, bismuth, antimony, lead, cobalt, iron, nickel or any other polyvalent metal which can be added to the composition by means of an oxide, hydroxide, or basic, acidic or neutral salt which has an appreciable solubility in water, such as at least about 1% by weight therein. The alkaline moiety may be provided by ammonia or an amine. The organic ligand may be ammonia or an amine or an organic bidentate amino acid. The amino acid bidentate ligand is preferably an aliphatic amino acid, but may also be a hetrocyclic amino acid.

The amino acid bidentate ligands may be represented by the formula $R_1(R_2)N—R_3—C(O)OH$ wherein $R_1$ and $R_2$ are independently selected from hydrogen, alkyl, phenyl and benzyl, $R_3$ represents a straight chain or branched chain alkylene, alkylidine or aralkylidene radical having 1 to 12 carbon atoms, preferably 1 to 6 carbon atoms, with the proviso that at least 1, but fewer than 4 carbon atoms are in a straight chain joining the nitrogen atom and the carbonyl carbon atom, and $R_1$ and $R_3$ may form a five or six-membered hexacilic ring with a nitrogen atom to which they are joined with the proviso that $R_2$ is hydrogen.

Although $R_1$ and $R_2$ are preferably hydrogen, suitable $R_1$ and $R_2$ alkyl radicals contain 1 to 6 carbon atoms such as methyl, ethyl, isopropyl and butyl. $R_3$ is preferably methylene, but may be ethylene, propylene, naphilidine, n-propylidine, isopropylidine, butylidine and phenylnaphilidine.

Representative bidentate amino acid ligands include glycine, alanine, beta-alanine, valine, norvaline gamma-amino butyric acid, leucine, norleucine, N-methylamino acetic acid, N-ethylamino acetic acid, dimethylamino acetic acid, diethylamino acetic acid, N-n-propylamino acetic acid, N-isopropylamino acetic acid, N-butylamino acetic acid, phenylalanine, N-phenylamino acetic acid, N-benzylamino acetic acid, and nicotinic acid.

Preferred polyvalent metal complexes include the diammonium zinc (II) and tetra-ammonium zinc (II) ions, cadmium glycinate, nickel glycinate, zinc glycinate, zirconium glycinate, zinc alanate, copper beta-alanate, zinc beta-alanate, zinc valanate, copper bisdimethylamino acetate.

The polyvalent metal complex or coordinate compounds are readily soluble in the aqueous medium of the polish vehicle composition, especially at a pH of 6.5 to 10.5. However, the polish containing these compounds dries to form a polish deposit which is essentially insoluble in water but still removable. The polyvalent metal complex may also be added as a solution to the water insoluble emulsion copolymer. This is accomplished by solubilizing the metal complex in an alkaline solution such as dilute aqueous ammonia. Since the ammonia may complex with the polyvalent metal coordinate compound, a compound such as cadmium glycinate, when solubilized in an aqueous ammonia solution may be named cadmium ammonia glycinate. Other polyvalent metal complexes described may be similarly named.

The polyvalent metal complexes must be stable in an alkaline solution; however, a complex that is too stable is undesirable because dissociation of the metal ion would be retarded during the film formation of the coating.

The amount of polyvalent metal compound added is preferably from about 15% to 100% of the equivalent of the acid residues of the copolymer emulsion, and may be at least about 15%. More preferably the amount of the polyvalent metal ionic crosslinking agent is from about 35% to 80% of the equivalent of the acid residues of the copolymer emulsion. Still more preferably the amount of the polyvalent metal crosslinking agent is from about 40% to 70% of the equivalent of the acid residues.

The water insoluble polymer obtained by emulsion polymerization employed in the composition of the present invention must provide a hardness such that the composition containing it deposits a film having a Knoop Hardness Number (KHN) of at least 0.5 and preferably from about 1.2 to 15, though for many purposes the KHN of the coating film deposited may be as high as 16 or greater when measured on a film of 0.5 to 2.5 ml thickness on a glass panel. The emulsion copolymer should also have a minimum film-forming temperature (MFT) of less than about 85° C. and preferably less than about 80° C.

The polyvalent metal crosslinker may be incorporated into the composition at any stage of the formulation. Although generally it is convenient to add the polyvalent metal complex to the water insoluble addition polymer, the metal complex may be incorporated at any stage of formulation of the floor polish itself.

In a similar manner, the basic salt of an alkaline metal may be incorporated with the polyvalent metal crosslinker at any stage of the formulation. Although it is generally more convenient to add the basic salt of an alkaline metal in a common solution with the polyvalent metal complex to the water in soluble addition polymer, it may be incorporated at any stage of formulation of the floor polish itself.

Compositions of the present invention must contain at least one basic salt of an alkaline metal such that the molar ratio of the polyvalent metal crosslinking agent to the alkaline metal is from about 1.0:0.10 to 1.0:3.0. Preferably this ratio is from about 1.0:0.25 to 1.0:2.0. More preferably this ratio is from about 1.0:0.5 to 1.0:1.5.

In general, polishing compositions using the crosslinked polymer of the present invention can be defined in terms of the following proportions of the main constituents:

| Constituent | Proportion |
|---|---|
| A. Water insoluble addition polymer emulsion which has been previously or subsequently crosslinked with a transition metal complex and alkaline metal basic salt, parts by solids weight. | 10–100 |
| B. Wax emulsion, parts by solids weight. | 0–90 |
| C. Alkali Soluble Resin (ASR), parts by solids weight | 0–90 |
| D. Wetting, emulsifying and dispersing agents, defoamer, leveling agents, parts by solids weight. | 0.01–20 |
| E. Plasticizers and coalescing solvents, sufficient for polish film formation at application temperature. | |
| F. Water, sufficient to make total polish solids 0.5% to 45%, preferably 5% to 30%. | |

The total of A, B, and C should be 100.

The amount of C, when present, may be up to 900% of A, and preferably from about 3% to 25% of the weight of A. Satisfactory floor polish formulations have been prepared without the inclusion of an ASR (C). Thus, an ASR is not an essential component of a more durable floor polish composition. Depending on the properties inherent to the emulsion polymer polish vehicle (A) and the other formulation ingredients (D and E), the ASR may be optionally employed to moderately reduce total formulation costs, improve leveling and gloss properties, and increase the polish sensitivity to alkaline strippers, depending on the ultimate balance of properties desired by the polish formulator and the qualities of the ASR.

For a nonbuffable, self-polishing composition (commonly called "dry-bright"), the wax solids should not exceed 35% of the total of A plus B plus C solids. The preferred wax level for a nonbuffable polish is 0 to 25%. Satisfactory nonbuffable floor polishes prepared with the compositions of this invention can be prepared without the inclusion of a wax. Thus, wax is not an essential component of a more durable, self-polishing composition, and the wax level may be optionally chosen by the formulator to marginally reduce total formulation costs and change the slip resistance characteristics of the polish film, depending on the quality of the wax employed and the final balance of polish properties desired by the formulator.

For a dry-buffable polish composition, the wax level should be at least 35% by weight of the total of A plus B plus C.

Examples of wetting and dispersing agents are well known in the art of floor polish formulating. These include amine and alkali metal salts of the higher fatty acids having 12 to 18 carbon atoms, such as the sodium, potassium, ammonium, morpholine oleate or recinoleate salts, as well as the common nonionic surface active agents and fluorocarbon surfactants. These agents serve to stabilize the polish formulation and also reduce its surface tension to improve the spreading action of the polish.

Defoamers and antifoams are commonly used in the practice of floor polish formulating to reduce or eliminate foam marks in the dried polish film. As the formulating art is currently practiced, these are typically fatty acids or silicone polymer emulsions. Silicone emulsions are preferred for their greater efficiency and long-term activity. Leveling agents are employed to provide smooth polish films of uniform gloss, without the ridges and swirls of uneven film deposition which reflect the patterns of the string mop or other applicator. In the practice of the floor polish formulating art, tri-butoxyethylphosphate, and its analogues, are typically used as the leveling agents of choice.

Plasticizers and coalescing solvents are employed in floor polish formulating to provide coherent films for the emulsion ingredients of the floor polish formulation under use-temperature conditions. As the art is currently practiced, plasticizing and coalescing solvents are employed in quantities sufficient to provide the formulation with a minimum film formation temperature (MFT) of less than 50° F. (10° C.). These solvents are well known to those versed in the art, and they include the alkyl and aromatic ethers of ethylene glycol, diethyleneglycol, triethyleneglycol, propylene glycol, dipropylene glycol, or tripropylene glycol, the alkyl or aromatic esters of these same glycols, the mono and dialkyl esters of phthalic acid, the mono and dialkyl esters of iso-octane diol, etc. The levels and selection of plasticizing and coalescing solvents employed may be optionally chosen by the formulator on the basis of efficiency in reducing the polish MFT, cost and availability, and their marginal effect on water resistance and gloss, depending on the balance of performance properties desired by the formulator.

Other formulation ingredients, such as perfumes or odor-masking agents, dyes or colorants, bacteriocides and bacteriostats, may also be optionally included by the formulator.

The following monomer abbreviations are used in giving polymer compositions:

| | |
|---|---|
| EA | ethyl acrylate |
| BA | butyl acrylate |
| MMA | methyl methacrylate |
| MAA | methacrylic acid |
| AA | acrylic acid |
| St | styrene |
| AN | acrylonitrile |
| 2-EHA | 2-ethyl hexyl acrylate |

In order to provide a clearer understanding of the invention, specific examples are set forth below. These examples are merely illustrative of this invention and are not meant to be understood as limiting the scope of the invention in any way.

COMPARATIVE EXAMPLE I

In this Example the maximum stable crosslinking level as a function of polymer type and copolymeric acid level is illustrated for pairs of emulsion copolymer and crosslinking agent in the absence of the basic alkaline metal salts of this invention. The crosslinking agent employed in this Comparative Example is $[Zn(NH_3)_4]CO_3$. The maximum stable level of crosslinking agent is determined by the appearance of ZnO and $Zn(OH)_2$ precipitate in the emulsion on aging. A 2:1 acid to Zn crosslinking stochiometry is assumed. The emulsion polymers employed in this Example are all acrylic and styrenated acrylic polymers having the compositions indicated below in Table I.

TABLE I

| Polymer Type | % Acid Charge | Polymer Composition[4] | Meq H+ Polymer | Max.[1] % Zn[2] | Theoretical[3] Max % Zn | % Stoch. Zn Level |
|---|---|---|---|---|---|---|
| ALL ACRYLIC | 3.5 MAA | 51.5 MAA/25 BA/20 EA/3.5 MAA | 0.41 | 0.24 | 1.34 | 18% |
| | 8 MAA | 59 MMA/33 BA/8 MAA[5] 59 MMA/33 EA/8 MAA | 0.93 | 1.06 | 3.04 | 35% |
| | 8.4 AA | 63.6 MMA/28 BA/8.4 AA | 1.16 | 1.63 | 3.79 | 43% |
| | 10 MAA | 62 MMA/28 BA/10 MAA 45 MMA/45 BA/10 MAA | 1.16 | 1.65 | 3.79 | 43% |
| | 12 MMA | 60 MMA/28 BA/12 MMA 40 MMA/48 BA/12 MMA | 1.40 | 2.15 | 4.58 | 47% |
| | 16.0 MAA | 40 MMA/44 BA/16 MAA | 1.86 | 6.10 | 6.08 | 100% |
| STYRENATED ACRYLIC | 3.5 MAA | 21.5 MMA/25 BA/3.5 MAA// 25 St/20 AN//5 St | 0.41 | 0.23 | 1.34 | 17% |
| | 6.0 MAA | 19 MMA/25 BA/6 MAA// 25 St/20 AN//5 St 21 EA/ 25 St/6 MAA//50 St | 0.70 | 0.52 | 2.29 | 23% |
| | 8 MAA | 22 AN/30 2-EHA/40 St/8 MAA 5 BA/55 BMA/32 St/8 MAA | 0.93 | 0.76 | 3.04 | 25% |
| | 10.0 MAA | 20 MMA/28 BA/45 St/10 MAA 27 MMA/38 BA/25 St/10 MAA | 1.16 | 1.32 | 3.79 | 35% |
| | 12.5 AA | 66 St/21.5 BA/12.5 AA | 1.74 | 3.12 | 5.69 | 55% |
| | 16.0 MAA | 31 MMA/28 BA/25 St/16 MAA 40 St/44 BA/16 MAA | 1.86 | 4.38 | 6.08 | 72% |
| | 16.0 AA | 18 MMA/26 BA/40 St/16 AA | 2.22 | 7.25 | 7.26 | 100% |

[1]As determined by appearance of ZnO and ZnOH precipitate in the emulsion on aging.
[2]Added as $[Zn(NH_3)_4](CO_3)$ solution.
[3]Assuming 2:1 acid to Zn crosslinking stochimetry.
[4]Styrenated Acrylic polymers contain > 25% Styrene in overall random copolymer compositon.
[5]Half-bracket indicated that identical results were obtained for either composition.

It is readily seen from the data presented in Table I above that at relatively low levels of polymer acid only a fraction of the theoretical maximum level of crosslinking is achieved.

EXAMPLE I

In this Example the effect of sodium hydroxide on the maximum crosslinker level in the emulsion vehicles of Comparative Example I is presented. The data presented in Table II details this effect.

These data indicate that the addition of sodium hydroxide in a 1 to 1 molar blend with the zinc ammonium bicarbonate crosslinking agent permits crosslinking at a 100% of the stoichiometric maximum possible zinc level.

EXAMPLE II

This Example details the formulation used for evaluation of the polish performance properties of floor polish vehicles of the instant invention.

| | |
|---|---|
| Polymer (25% total solids) | 85 parts |
| Poly-Em 40[7] (25% total solids) | 15 parts |
| FC-129 (1% total solids)[1] | 1.0 part |
| SWS-211[2] | 0.02 parts |
| Methylcarbitol[3] | 3.3 parts |
| Proposol DM[4] | 5.0 parts |
| KP-140[5] | 1.7 parts |

TABLE II[1]

| % Acid Charge | Polymer Composition[4] | Meq H+/g Polymer | Theoretical[2,3] Max. % Zn | Stable % Zn Charge | % Stoch. Zn Level |
|---|---|---|---|---|---|
| 6.0 MAA | 6.0 MAA/19 MMA/25 BA//[5] 25 St/20 AN//5 St 6.0 MAA/21 EA/25 St//50 St | 0.70 | 2.29 | 2.3 | 100% |
| 8.0 MAA | 8.0 MAA 59 MMA/33 BA 8.0 MAA/59 MMA/33 EA | 0.93 | 3.04 | 3.0 | 100% |
| 8.0 MAA | 8.0 MAA/22 AN/30 2-EHA/40 St 8.0 MAA/5 BA/55 BMA/32 St | 0.93 | 3.04 | 3.0 | 100% |
| 8.4 AA | 8.4 AA/63.6 MMA/28 BA | 1.16 | 3.79 | 3.8 | 100% |
| 10.0 MAA | 10.0 MAA/62 MMA/28 BA 10.0 MAA/45 MMA/45 BA | 1.16 | 3.79 | 3.8 | 100% |
| 10.0 MAA | 10.0 MAA/20 MMA/28 BA/45 St 10.0 MAA/27 MMA/38 BA/25 St | 1.16 | 3.79 | 3.8 | 100% |
| 12.0 MAA | 12 MMA/60 MMA/28 BA 12 MAA/40 MMA/48 BA | 1.40 | 4.58 | 4.6 | 100% |
| 12.5 AA | 12.5 AA/66 St/21.5 BA | 1.74 | 5.69 | 5.8 | 100% |
| 16 MAA | 16 MAA/40 MMA/44 Ba | 1.86 | 6.08 | 6.1 | 100% |
| 16 MAA | 31 MMA/28 BA/25 St/16 MAA 16 MAA/40 St/44 BA | 1.86 | 6.08 | 6.1 | 100% |
| 16 AA | 16 MMA/26 BA/40 St | 2.22 | 7.25 | 7.3 | 100% |

[1]Notes as above, except as specified.
[2]Charged as 1:1 molar blend solution of $[Zn(NH_3)_4](HCO_3)_2$//NAOH.

-continued

| Dibutyl phthalate[6] | 1.7 parts |

[1]Fluorocarbon surfactant, wetting aid supplied by 3M Company.
[2]Silicone emulsion, defoamer supplied by Stauffer-Wacker Silicone Company.
[3]Diethylglycol Monomethylether, coalescent, supplied by Union Carbide.
[4]Dipropylene Glycol Monomethylether, coalescent, supplied by Union Carbide.
[5]Tributoxyethyl Phosphate, leveling aid and plasticizer, supplied by FMC Corp.
[6]Plasticizer supplied by Allied Chemical Company.
[7]Polyethylene wax emulsion, supplied by Rohm and Haas Company.

EXAMPLE III

This Example details the emulsion and polish properties of a mixed metal crosslinked floor polish polymer based on acrylic monomers. This emulsion copolymer has the composition 62 parts butyl acrylate, 28 parts methyl methacrylate, and 10 parts methacrylic acid. The crosslinked emulsions of this Example were formulated according to the details presented in Example II.

The polishes were applied and tested by the procedure described in Resin Review, Volume XVI, No. 2, 1966 published by Rohm and Haas Company, Philadelphia, Pa., 19105 except when another procedure is specified.

Wear tests were carried out in a corridor having a filled-vinyl tile floor which is subjected to a daily traffic load of 800 to 1200 pedestrian passes. A section of the corridor (5 feet wide by 24 feet long) was cordoned off and stripped of residual polish then repolished in the typical janitorial procedure, as follows:

The floor was dust mopped to remove loose dirt; a 1:1 aqueous solution of Step-Off ® commercial stripper, (S. C. Johnson & Son, Inc., Racine, Wis. 53404) was applied by string mop at a rate of ca. 1000 sq. ft./gal.; after a 5 minute soak period, the floor was scrubbed with a 16 inch black stripping floor pad (3M Company, St. Paul, Minn. 55101; Scotch Brite Slim Line Floor Pad #61-6520-0105-0) on a 175 rpm floor machine (the Danzig Floor Machine Co., Dumont, N.J. 07628, Model 175). The spent stripper solution was mopped up; the stripped floor was thoroughly rinsed twice by damp mopping with clear water, and allowed to dry.

The stripped floor was divided into equal sections perpendicular to the normal direction of corridor traffic flow. To each of these sections a coat of the polish to be tested was applied with a string mop at a rate of ca. 2000 sq. ft./gal. After allowing one hour for the initial polish coat to dry, a second coat was applied in the same manner. The appearance of the polishes were rated initially and after each week of trafficking.

At the end of the test the polishes were machine scrubbed with a 1:20 aqueous solution of Forward ® industrial, alkaline cleaner, (S. C. Johnson & Son, Inc., Racine, Wis. 53404) using a 16 inch brown scrubbing floor pad (3M Company, St. Paul, Minn. 55101; Scotch Brite Slim Line Floor pad #61-6526-006-7) on the 175 rpm floor machine. After rinsing with a damp mop and clear water the floor was allowed to dry and the polishes were then evaluated for detergent resistance and cleanability. The polishes were stripped from the floor as described above, and were rated for removability.

Comparison of the polish properties of the various floor polish formulations given above indicates that polish C containing both zinc crosslinker and sodium hydroxide exhibits better black heel mark resistance and soil resistance than polishes in which either the sodium hyroxide or the zinc crosslinking agent are omitted (polishes E and B). Similarly, polish C's durability is also superior to polish A in which the sodium hydroxide is replaced by ammonium hydroxide and polish D in which the sodium hydroxide is replaced with sodium chloride.

TABLE III

|  | A | B | C | D | E |
| --- | --- | --- | --- | --- | --- |
| A. Emulsion Properties |  |  |  |  |  |
| % Zn (Metal/Polymer Solids)[1] | 1.65 | 1.65 | 1.65 | 1.65 | 0 |
| Metal Compound (X) | NH$_4$OH | None | NaOH | NACl | NaOH |
| % X[2](Wt. X/p. solids) | 2.74 | 0 | 3.13 | 4.58 | 3.13 |
| Mole Ratio X/Zn | 3.10 | 0 | 3.10 | 3.10 | 0 |
| Stochiometry in Zn[3] | 43% | 43% | 43% | 43% | 0 |
| Total Stochiometry[4] | 111% | 43% | 110% | 111% | 67% |
| pH[5] | 7.8 | 7.6 | 9.2 | 7.5 | 8.3 |
| Total Solids[5] | 34.1 | 38.2 | 36.9 | 38.0 | 39.4 |
| Viscosity (cps)[5] | 22 | 24 | 41 | 22 | 875 |
| MFT (°C.) | 69° | 72° | 77° | 70° | 42° |
| Polymer Hardness, KHN | 15.0 | 18.2 | 15.3 | 12 | 15.0 |
| B. Polish Properties[18] |  |  |  |  |  |
| Polymer |  |  |  |  |  |
| Total Solids[6] | 25 | 25 | 25 | 25 | 25 |
| Polish Stability (1 Mo.50° C.)[7] |  |  |  |  |  |
| Initial pH/Viscosity (cps) | 8.2/5.6 | 8.2/5.5 | 9.0/6.1 | 8.2/5.0 | 8.6/68 |
| Final pH/Viscosity (cps) | 8.2/8.8 | 8.1/8.2 | 8.8/7.8 | 8.2/9.0 | 8.6/10K |
| Leveling | Good | Good | Good | Good-VG | Poor |
| Gloss (Visual/60°)[8] | Good-VG/45 | Good-VG/43 | Good-VG/45 | Good-VG/33 | Good-VG/48 |
| Recoat Leveling | Exc. | Exc. | Exc. | VG | Poor |
| Recoat/Gloss (Visual/60°)[8] | VG-Exc/65 | VG-Exc/67 | VG-Exc/61 | G-VG/47 | VG-Exc/76 |
| Recoatability[9] | Exc. | Exc. | Exc. | VG-Exc. | Poor |
| Water Resistance (1 Hr/1 Day)[10] | G-VG/Exc. | G-VG/Exc. | G-VG/Exc. | G-VG/G-VG | Poor/Poor |
| Detergent Resistance[11] |  |  |  |  |  |
| 1 Day | VG | VG | VG | VG | Poor |
| 7 Days | VG-Exc. | VG-Exc. | VG-Exc. | VG | Fair |
| Removability[12] | G-VG | G-VG | G-VG | Exc. | Exc. |
| Black Heel Mark Resistance[16] | Good | Good | Excellent | Good | Very Good |
| Soil Resistance[13] | Good | Good | Very Good | Fair | Fair |
| Slip Resistance[15] | Exc. | Exc. | Exc. | Exc. | Exc. |
| Scuff Resistance[12] | VG | VG | VG | VG | Good |
| Polish Hardness (KHN) |  |  |  |  |  |
| 1 Day | 2.7 | 2.6 | 3.8 | 2.6 | 1.8 |
| 3 Days | 4.4 | 4.3 | 5.1 | 4.2 | 3.4 |

TABLE III-continued

|  | A | B | C | D | E |
|---|---|---|---|---|---|
| 7 Days | 4.9 | 5.0 | 6.2 | 4.9 | 4.0 |
| Powdering[14] | Nil | Nil | Nil | Slight | Moderate |

[1]Charged as 8.4% Zn (metal/solution weight) solution as [Zn (NH$_3$)$_4$] (HCO$_3$)$_2$
[2]Charged as aqueous solution to Zn - crosslinked polymer emulsion
[3]Assuming 2:1 acid/Zn molar stochiometry
[4]With note 3, assuming 1:1 acid/X molar stochiometry
[5]ASTM D 3716-78
[6]ASTM D 2834-72 (1977)
[7]ASTM D 1791-66 (1977)
[8]ASTM D 1455-78
[9]ASTM D 3153-78
[10]ASTM D 1793-79
[11]ASTM D 3207-73 (1978)
[12]ASTM D 1792-77
[13]ASTM D 3206-73 (1978)
[14]ASTM D 2048-77
[15]CSMA 245-70
[16]CSMA 9-73
[17]CSMA 9-73 run on black VA tiles.

EXAMPLE IV

In this Example the emulsion and floor polish properties of mixed metals crosslinked floor polish polymers and the corresponding floor polishes are given for an emulsion polymer containing styrene. This emulsion polymer has the composition 26 parts butyl acrylate, 18 parts methyl methacrylate, 40 parts styrene, 14.4 parts methacrylic acid, and 1.6 parts acrylic acid.

The emulsion was crosslinked with Zn (as [Zn(NH$_3$)$_4$] (HCO$_3$)$_2$) and K (as KOH) and formulated according to the details presented in Example II. The polishes were applied and tested, both at the bench and in wear tests, as described above for Example III, with the exception that the polymer emulsion charge was increased to 87 parts, and the wax emulsion charge was reduced to 13 parts.

In this Example the ratio of potassium hydroxide to zinc complex is varied. The black mark resistance of polishes G through J, all of which contain potassium hydroxide, is superior to that of Example F which contains no potassium hydroxide.

TABLE IV

|  | F | G | H | I | J |
|---|---|---|---|---|---|
| A. Emulsion Properties: | | | | | |
| mm Zn (per 100 g. P. Solids)[1] | 47.4 | 47.4 | 47.4 | 63.2 | 71.1 |
| mm KOH (per 100 g. P. Solids) | 0 | 47.4 | 94.8 | 63.2 | 47.4 |
| Stochiometry in Zn[3] | 50% | 50% | 50% | 67% | 75% |
| Total Stochiometry[4] | 50% | 75% | 100% | 100% | 100% |
| K/Zn Molar Ratio | 0 | 1.0 | 2.0 | 0.5 | 0.33 |
| Viscosity (cps) | 77 | 89 | 110 | 54 | 25 |
| pH[5] 7.8 | 7.8 | 8.4 | 8.8 | 8.7 | 8.8 |
| MFT (°C.) | 81° | 86° | 84° | 88° | 92° |
| B. Polish Properties: | | | | | |
| Polymer | | | | | |
| Solids[6] | 25 | 25 | 25 | 24 | 25 |
| pH/Viscosity (cps)[7] | 8.0/8.4 | 8.3/8.9 | 8.6/12.5 | 8.6/9.1 | 8.5/6.3 |
| Gloss (One Coat/Recoat.)[8] | VG-Exc. | VG-Exc. | VG-Exc. | VG-Exc. | VG-Exc. |
| Recoatability[9] | VG | VG | VG | VG-Exc. | Exc. |
| Mark Resistance | Good | Superior | Outstanding | Exc.-Superior | Exc. |
| Water Resistance (1 Hr. 1 Day)[10] | G/VG | G/VG | G/G | G-VG/VG | G-VG/VG |
| Detergent Resistance[11] | | | | | |
| One Day | G-VG | Good | Good | VG | VG |
| One Week | VG | G-VG | Good | VG-Exc. | Exc. |
| Removability (One Week)[12] | VG | VG | VG | VG-Exc. | Exc. |
| Polish Hardness (KHN) 1 Day/1 Week | 2.2/5.2 | 2.8/6.6 | 2.0/6.9 | 2.5/6.2 | 2.3/6.0 |
| Powdering (10% RH)[14] | Nil | Nil | Nil | Nil | Nil |
| C. Polish Wear Test Performance[18] | | | | | |
| Polymer | | | | | |
| Initial: | | | | | |
| Gloss | Exc. | Exc. | Exc. | | |
| Leveling | Exc. | Exc. | Exc. | | |
| Recoatability | Exc. | Exc. | Exc. | | |
| After Two Weeks of Traffic: | | | | | |
| Gloss | VG-Exc. | VG-Exc. | VG-Exc. | | |
| Soil Resistance | VG-Exc. | Exc. | Exc. | | |
| Mark Resistance | VG | Exc. | Exc. | | |
| Scuff Resistance | VG | VG | VG | | |
| Overall Appearance | VG | VG-Exc. | VG-Exc. | | |
| After Four Weeks of Traffic: | | | | | |
| Gloss | Good | VG | VG | | |
| Soil Resistance | Good | VG | VG | | |
| Mark Resistance | Good | Exc. | Exc. | | |
| Scuff Resistance | Good | Good | Good | | |
| Overall Appearance | Good | VG | VG | | |
| After Six Weeks of Traffic: | | | | | |

TABLE IV-continued

|  | F | G | H | I | J |
|---|---|---|---|---|---|
| Gloss | F-G | G-VG | G-VG | | |
| Soil Resistance | F-G | VG | VG | | |
| Mark Resistance | Fair | Exc. | Exc. | | |
| Scuff Resistance | Fair | F-G | F-G | | |
| Overall Appearance | Fair | G-VG | G-VG | | |
| Machine Scrub Detergent Resistance | VG | VG | VG | | |
| Cleanability | VG | VG-Exc. | VG-Exc. | | |
| Machine Scrub Removability | VG | VG-Exc. | Exc. | | |

[1] Charged as 8.4% Zn (metal/solution weight) solution as [Zn (NH$_3$)$_4$] (HCO$_3$)$_2$
[3] Assuming 2:1 acid/Zn molar stochiometry
[4] With note 3, assuming 1:1 acid/X molar stochiometry
[5] ASTM D 3716-78
[6] ASTM D 2834-72 (1977)
[7] ASTM D 1791-66 (1977)
[8] ASTM D 1455-78
[9] ASTM D 3153-78
[10] ASTM D 1793-79
[11] ASTM D 3207-73 (1978)
[12] ASTM D 1792-77
[13] ASTM D 2048-88
[16] CSMA (Chemical Specialties Mfg. Assoc.) 9-73
[18] The polish performance rating abbreviations used are: Exc. = Excellent; VG = Very Good; G = Good; F = Fair; - = "to" when used between abbreviations.

We claim:

1. A floor polish vehicle composition which yields floor polishes with improved durability and which includes an emulsion copolymer containing from about 3% to 50% by weight of residues of at least one acidic monomer, and from at least about 15% of the equivalent of the copolymer acid residues of dissolved polyvalent metal ionic crosslinking agent wherein the improvement comprises at least one basic salt of an alkali metal such that the molar ratio of the polyvalent metal ion to the alkali metal ion is from about 10:0.10 to 1.0:3.0.

2. A floor polish vehicle composition according to claim 1 which yields polishes with improved durability and which includes an emulsion copolymer containing from about 3% to 50% by weight of residues of at least one acidic monomer, and from about 15% to 100% of the equivalent of the copolymer acid residues of polyvalent metal ionic crosslinking agent wherein the improvement comprises at least one basic salt of an alkali metal such that the molar ratio of the polyvalent metal to the alkali metal is from about 10:0.10 to 1.0:3.0.

3. A floor polish vehicle composition according to claim 2 wherein the copolymer contains from about 0% to about 70% by weight of residues of at least one vinyl aromatic monomer, from 0% to about 40% by weight of residues of at least one polar or polarizable nonionogenic hydrophilic monomer, from 0% to about 10% by weight of residues of at least one monomeric vinyl ester in which the acid moeity of the ester selected from the aromatic and (C$_1$-C$_{18}$) aliphatic acids, and from 0% to about 97% by weight of residues of at least one monomer selected from the acrylic and methacrylic acid esters of (C$_1$-C$_8$) alcohols.

4. A composition according to claim 3 wherein the polyvalent metal is from about 35% to 80% of the equivalent of the acid residues and the molar ratio of polyvalent to alkali metal is from about 1.0:0.25 to 1.0:2.0.

5. A composition according to claim 4 wherein the polyvalent metal is from about 40% to 70% of the equivalent of the acid residues and the molar ratio of polyvalent to alkali metal is from about 1.0:0.5 to 1.0:1.5.

6. A floor polish vehicle composition according to claim 3 wherein the emulsion copolymer contains from about 6% to 30% by weight of residues of at least one acidic monomer, from 0% to about 25% by weight of residues of at least one polar or polarizable nonionogenic hydrophilic monomer, from 0% to about 5% by weight of residues of at least one monomeric vinyl ester in which the acid moeity of the ester is selected from the aromatic (C$_1$-C$_{18}$) aliphatic acids, and from about 20% to 90% by weight of residues of at least one monomer selected from the acrylic and methacrylic acid esters of (C$_1$-C$_8$) alcohols.

7. A composition according to claim 6 wherein the polyvalent metal is from about 35% to 80% of the equivalent of the acid residues and the molar ratio of the polyvalent to alkali metal is from about 1.0:0.25 to 1.0:2.0.

8. A composition according to claim 7 wherein the polyvalent metal is from about 40% to 70% of the equivalent of the acid residues and the molar ratio of the polyvalent to alkali metal is from about 1.0:0.5 to 1.0:1.5.

9. A floor polish vehicle composition according to claim 3 wherein the emulsion copolymer contains from about 10% to 25% by weight of residues of at least one acidic monomer, from about 10% to 50% by weight of residues of at least one vinyl aromatic monomer, from 0% to about 15% by weight of residues of at least one polar or polarizable nonionogenic hydrophilic monomer, and from about 30% to 90% by weight of residues of at least one monomer selected from the acrylic and methacrylic acid esters of (C$_1$-C$_8$) alcohols.

10. A composition according to claim 9 wherein the polyvalent metal is from about 35% to 80% of the equivalent of the acid residues and the molar ratio of the polyvalent to alkali metal is from about 1.0:0.25 to 1.0:2.0.

11. A composition according to claim 10 wherein the polyvalent metal is from about 40% to 70% of the equivalent of the acid residues and the molar ratio of the polyvalent to alkali metal is from about 1.0:0.5 to 1.0:1.5.

12. A floor polish vehicle composition according to claim 3 wherein the acidic monomer is selected from acrylic, methacrylic, itaconic, maleic and fumaric acids and maleic anhydride, the vinyl aromatic monomer is selected from styrene and vinyl toluene, and the nonionogenic monomer is selected from acrylonitrile and the hydroxy (C$_1$-C$_4$) alkyl (meth)acrylates.

13. A floor polish composition comprising a floor polish vehicle according to claim 1.

14. A floor polish composition comprising a floor polish vehicle according to claim 2.

15. A floor polish composition comprising a floor polish vehicle according to claim 3.

16. A floor polish composition comprising a floor polish vehicle according to claim 4.

17. A floor polish composition comprising a floor polish vehicle according to claim 5.

18. A floor polish composition comprising a floor polish vehicle according to claim 6.

19. A floor polish composition comprising a floor polish vehicle according to claim 7.

20. A floor polish composition comprising a floor polish vehicle according to claim 8.

21. A floor polish composition comprising a floor polish vehicle according to claim 9.

22. A floor polish composition comprising a floor polish vehicle according to claim 10.

23. A floor polish composition comprising a floor polish vehicle according to claim 11.

24. A floor polish composition comprising a floor polish vehicle according to claim 12.

* * * * *

UNITED STATES PATENT AND TRADEMARK OFFICE
CERTIFICATE OF CORRECTION

PATENT NO. : 4,517,330

DATED : May 14, 1985

INVENTOR(S) : Richard E. Zdanowski and Joseph M. Owens

It is certified that error appears in the above-identified patent and that said Letters Patent is hereby corrected as shown below:

Column 19,
Claim 1, line 32, delete the phrase "10:0.10" and replace it with the phrase -- 1.0:0.10 --.

Column 19,
Claim 2, line 42, delete the phrase "10:0.10" and replace it with the phrase -- 1.0:0.10 --.

Signed and Sealed this

Twenty-second Day of April, 1997

Attest:

BRUCE LEHMAN

*Commissioner of Patents and Trademarks*

*Attesting Officer*